(12) United States Patent
Intelmann et al.

(10) Patent No.: US 12,400,799 B2
(45) Date of Patent: Aug. 26, 2025

(54) PROCESS FOR THE PRODUCTION OF A LAYER COMPOSITION

(71) Applicant: Heraeus Deutschland Gmbh & Co. KG, Hanau (DE)

(72) Inventors: Matthias Intelmann, Leverkusen (DE); Udo Merker, Leverkusen (DE)

(73) Assignee: HERAEUS EPURIO GMBH, Hanau (DE)

( * ) Notice: Subject to any disclaimer, the term of this patent is extended or adjusted under 35 U.S.C. 154(b) by 255 days.

(21) Appl. No.: 18/251,339

(22) PCT Filed: Oct. 27, 2021

(86) PCT No.: PCT/EP2021/079874
§ 371 (c)(1),
(2) Date: May 1, 2023

(87) PCT Pub. No.: WO2022/096348
PCT Pub. Date: May 12, 2022

(65) Prior Publication Data
US 2023/0420190 A1 Dec. 28, 2023

(30) Foreign Application Priority Data
Nov. 6, 2020 (EP) .................................. 20206304

(51) Int. Cl.
*H01G 9/028* (2006.01)
*H01G 9/00* (2006.01)
*H01G 9/15* (2006.01)

(52) U.S. Cl.
CPC ........... *H01G 9/028* (2013.01); *H01G 9/0036* (2013.01); *H01G 9/15* (2013.01)

(58) Field of Classification Search
None
See application file for complete search history.

(56) References Cited

U.S. PATENT DOCUMENTS 9,508,491 B2 * 11/2016 Merker .................. H01G 9/028
10,109,427 B2 * 10/2018 Ishikawa ................ H01G 9/025
(Continued)

FOREIGN PATENT DOCUMENTS

| CN | 101486839 A | 7/2009 |
|---|---|---|
| CN | 102378785 A | 3/2012 |

(Continued)

OTHER PUBLICATIONS

Panche et al., "Flavonoids: an overview," Journal of Nutritional Science, vol. 5, pp. 1-15 (2016).

*Primary Examiner* — Dion R. Ferguson
(74) *Attorney, Agent, or Firm* — Panitch Schwarze Belisario & Nadel LLP

(57) ABSTRACT

A process for the production of a layer composition, comprising the process steps: a) provision of a substrate with a substrate surface; b) formation of a stabilized electrically conductive polymer layer on at least a pail of the substrate surface, the formation of the stabilized electrically conductive polymer layer comprising the process steps: b1) formation of an electrically conductive polymer layer comprising an electrically conductive polymer on at least a part of the substrate surface; b2) application of a liquid stabilizer phase, comprising at least one stabilizer and at least one solvent or dispersant, onto the electrically conductive polymer layer obtained in process step b1) for the formation of a stabilizer layer, wherein the at least one stabilizer is a flavonoid. The present invention also relates to a layer composition and to the use of a layer composition.

12 Claims, 2 Drawing Sheets

(56) References Cited

U.S. PATENT DOCUMENTS

| | | | |
|---|---|---|---|
| 11,600,449 B2 | 3/2023 | Ishikawa et al. | |
| 2012/0091399 A1 | 4/2012 | Guntermann et al. | |
| 2013/0279079 A1* | 10/2013 | Merker | H01G 9/0036 |
| | | | 29/25.41 |
| 2013/0295389 A1* | 11/2013 | Ishikawa | C09D 165/00 |
| | | | 428/419 |
| 2023/0420190 A1* | 12/2023 | Intelmann | H01G 9/028 |

FOREIGN PATENT DOCUMENTS

| | | |
|---|---|---|
| CN | 103154132 A | 6/2013 |
| DE | 102005043828 A1 | 3/2007 |
| DE | 102009012660 A1 | 9/2010 |
| EP | 0340512 A2 | 11/1989 |
| EP | 0440957 A2 | 8/1991 |
| EP | 1798259 A1 | 6/2007 |
| JP | 2014-148674 A | 8/2014 |
| KR | 2011 0035991 A | 4/2011 |
| KR | 20130113464 A | 10/2013 |
| TW | 201229159 A | 7/2012 |
| WO | 98/25275 A1 | 6/1998 |
| WO | 2008055834 A1 | 5/2008 |
| WO | 2012041507 A1 | 4/2012 |

\* cited by examiner

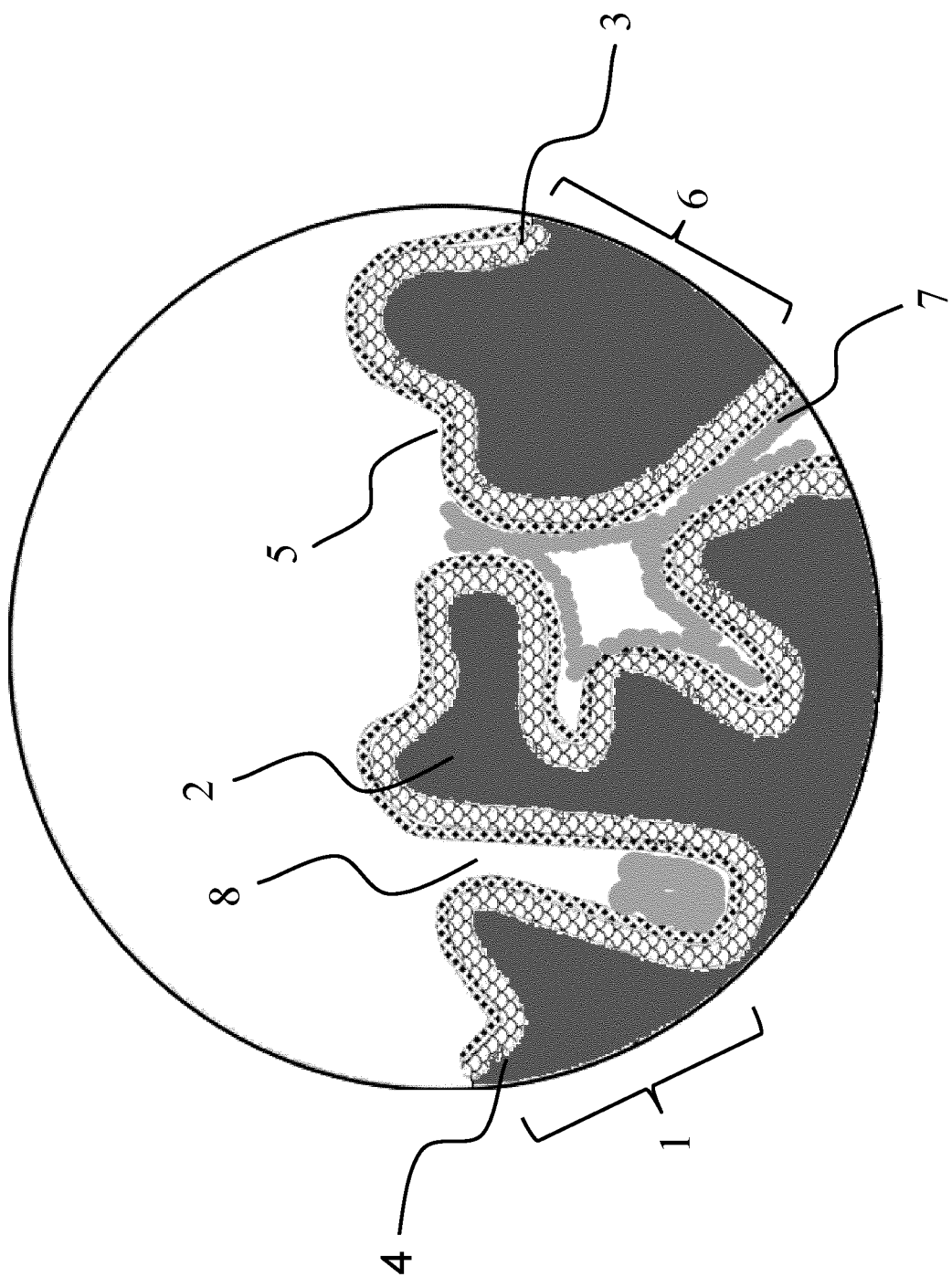

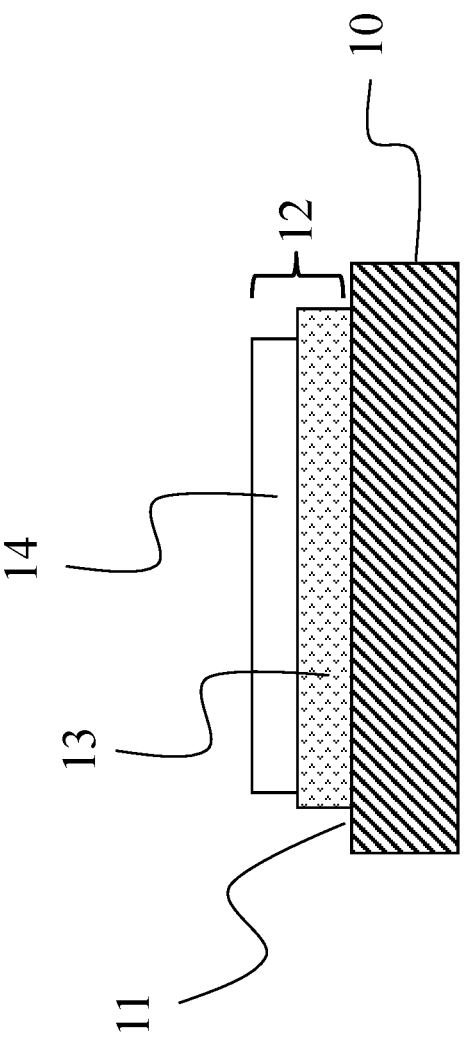

PROCESS FOR THE PRODUCTION OF A LAYER COMPOSITION

The present invention relates generally to a process for the production of a layer composition, for example by treatment of electrically conductive polymers with stabilizers, layer compositions and the use of such layer compositions.

Electrically conductive polymers from the class of polypyrroles, polyanilines and polythiophenes are known from the literature. Poly(3,4-alkylenedioxythiophene) dispersions in particular have recently acquired technical importance, since they can be used, for example, for the production of conductive or antistatic coatings (see e.g. EP 440 957 A1). In practice, however, it has been found that the electrical conductivity of the coatings from such dispersions is not always sufficiently stable for practical uses at a higher temperature.

EP 1 798 259 A1 and WO 2008/055834 A1 describe that the heat stability of the electrical conductivity of coatings containing polythiophene dispersions can be increased if, for example, derivatives of gallic acid (3,4,5-trihydroxybenzoic acid) are added. Nevertheless, the addition of these stabilizers often leads to the dispersions used becoming unstable. Furthermore, these stabilizers cannot be added to reactive mixtures of monomers and oxidizing agents for the production of conductive coatings, since these stabilizers interfere in the oxidative polymerization, e.g. by complexing with the oxidizing agent.

There therefore continued to be a need for processes for the production of electrically conductive layers from conductive polymers with improved temperature stability and layer compositions comprising these.

One of the main fields of use for electrically conductive layer compositions comprising conductive polymers is solid electrolyte capacitors.

A commercially available electrolyte capacitor as a rule is made of a porous metal electrode, an oxide layer on the metal surface, an electrically conductive material, usually a solid, which is introduced into the porous structure, an outer electrode (contacting), such as e.g. a silver layer, and further electrical contacts and an encapsulation. An electrolyte capacitor which is frequently used is the tantalum electrolyte capacitor, the anode electrode of which is made of the valve metal tantalum, on which a uniform, dielectric layer of tantalum pentoxide has been generated by anodic oxidation (also called "forming"). A liquid or solid electrolyte forms the cathode of the capacitor. Aluminium capacitors in which the anode electrode is made of the valve metal aluminium, on which a uniform, electrically insulating aluminium oxide layer is generated as the dielectric by anodic oxidation, are furthermore frequently employed. Here also, a liquid electrolyte or a solid electrolyte forms the cathode of the capacitor. The aluminium capacitors are usually constructed as wound- or stack-type capacitors.

π-conjugated polymers are particularly suitable as solid electrolytes in the capacitors described above because of their high electrical conductivity. π-conjugated polymers are also called conductive polymers or synthetic metals. They are increasingly gaining economic importance, since polymers have advantages over metals with respect to processability, weight and targeted adjustment of properties by chemical modification. Examples of known π-conjugated polymers are polypyrroles, polythiophenes, polyanilines, polyacetylenes, polyphenylenes and poly(p-phenylene-vinylenes), a particularly important polythiophene used technically being poly(3,4-ethylenedioxythiophene) (PEDOT), since it has a very high conductivity in its oxidized form.

The solid electrolytes based on conductive polymers can be applied to the oxide layer in various ways and manners. EP 0 340 512 A1, for example, describes the preparation of a solid electrolyte from 3,4-ethylenedioxythiophene and the use thereof in electrolyte capacitors. According to the teaching of this publication, 3,4-ethylene-dioxythiophene is polymerized on to the oxide layer in situ.

DE-A-10 2005 043828, on the other side, describes a process for the production of solid electrolytes in capacitors, in which a dispersion comprising the already polymerized thiophene, for example the PEDOT/PSS dispersions known from the prior art, is applied to the oxide layer and the dispersing agent is then removed by evaporation. In this context WO 2012/041507 A1 discloses a process for the production of a layer composition, in which onto a conductive polymer layer that is preferably based on PEDOT/PSS a stabilizer layer is applied and wherein the stabilizer is an aromatic compound with at least two OH groups. The preferred stabilizer used in WO 2012/041507 A1 is tannin.

Generally, the object according to the invention was to eliminate or at least mitigate the disadvantages emerging from the prior art.

The object of the present invention was furthermore to provide layer compositions which can be produced easily and display good properties in capacitors and other uses, such as antistatic layer compositions. Furthermore, a process for the production of these layer compositions which can readily be used commercially, especially in the abovementioned uses, is to be provided.

A further object was to improve the heat stability of such layer compositions, preferably at conditions of high temperature and high humidity, and in particular as polymer solid electrolyte capacitors.

Furthermore, an object according to the invention was to provide a layer composition which, in particular as a capacitor, displays advantageous properties, such as an equivalent series resistance (ESR) which increases as little as possible and a dissipation factor which likewise increases just as little, with a capacitance which is as constant as possible during exposure to heat or heat and humidity. In the case of layers, a lowest possible increase in the surface resistance was to be achieved upon treatment with heat or heat and humidity.

A contribution towards achieving at least one of the abovementioned objects is made by a process for the production of a layer composition, comprising the process steps:
 a) provision of a substrate with a substrate surface;
 b) formation of a stabilized electrically conductive polymer layer on at least a part of the substrate surface, the formation of the stabilized electrically conductive polymer layer comprising the process steps:
  b1) formation of an electrically conductive polymer layer comprising an electrically conductive polymer on at least a part of the substrate surface;
  b2) application of a liquid stabilizer phase, comprising at least one stabilizer and at least one solvent or dispersant, onto the electrically conductive polymer layer obtained in process step b1) for the formation of a stabilizer layer, wherein the at least one stabilizer is a flavonoid.

It has been found, completely surprisingly, that the use of stabilizers selected from the group consisting of a flavonoid, gallic acid or a mixture thereof, in the form of a stabilizer layer that is applied onto a layer of an electrically conductive polymer layer, in particular in capacitors, leads to a significant improvement in the heat stability of the layer or of the capacitor.

Electrically conductive layer here is understood as meaning, amongst others, also those layers which already have a low electrical conductivity and are often also called an antistatic layer. Generally, electrical conductivity of the layers means that these have a conductivity preferably in the range of from 1 µS/cm to 10,000 S/cm.

A substrate is first provided in process step a) of the process according to the invention. Substrates can be made of, for example, paper, polymers, glass or ceramic. For optical uses, the substrate is preferably transparent or light-transmitting. Transparent substrates can be made of glass, extremely thin glass (flexible glass) or plastics. Particularly suitable plastics are: polycarbonates, polyesters, such as e.g. PET and PEN (polyethylene terephthalate or polyethylene-naphthalene dicarboxylate), copolycarbonates, polysulphone, polyether sulphone (PES), polyimide, polyethylene, polypropylene or cyclic polyolefins or cyclic olefin copolymers (COC), hydrogenated styrene polymers or hydrogenated styrene copolymers. Rigid or flexible substrates can be used.

In a particular embodiment of the use, such as in capacitors, it is preferable for the substrate to comprise an electrode body of an electrode material, the surface of this electrode material being at least partly covered by a dielectric. In the present case, an electrode body coated with a dielectric is called an anode body. An anode body can also have further layers, in addition to the electrode and the dielectric. The surface of the anode body, often the dielectric, which can optionally also have further layers, is a substrate surface in the context of the present invention.

In principle, the electrode body can be produced by pressing a valve metal powder of high surface area and sintering it to give a mostly porous electrode body. An electrical contact wire, preferably of a valve metal, such as e.g. tantalum, is conventionally also pressed into the electrode body here. The electrode body is then coated, for example by electrochemical oxidation, with a dielectric, i.e. an oxide layer. Alternatively, metal foils can also be etched and coated with a dielectric by electrochemical oxidation in order to obtain an anode foil with a porous region. In a wound capacitor, an anode foil with a porous region, which forms the electrode body, and a cathode foil are separated by separators and wound up.

In the context of the invention, valve metal is to be understood as meaning those metals of which the oxide layers do not render possible current flow equally in both directions. In the case of an anodically applied voltage, the oxide layers of the valve metals block the current flow, while in the case of a cathodically applied voltage large currents occur, which may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best-known representatives of the valve metals are Al, Ta and Nb. Compounds with electrical properties comparable to a valve metal are those with metallic conductivity, which can be oxidized and of which the oxide layers have the properties described above. For example, NbO has metallic conductivity, but in general is not regarded as a valve metal. Layers of oxidized NbO have, however, the typical properties of valve metal oxide layers, so that NbO or an alloy or compound of NbO with other elements are typical examples of such compounds with electrical properties comparable to a valve metal. Electrode materials of tantalum, aluminium and those electrode materials based on niobium or niobium oxide are preferred. Tantalum is particularly preferred as the electrode material.

For production of the electrode body often with a porous region, the valve metals can be sintered, for example in powder form, to give a mostly porous electrode body, or a porous structure is stamped on a metallic body. The latter can be carried out e.g. by etching a foil.

For simplicity, bodies with a porous region are also called porous in the following. Thus, for example, electrode bodies with a porous region are also called porous electrode bodies. On the one hand, the porous bodies can be permeated by a plurality of channels and therefore be sponge-like. This is often the case if tantalum is used for construction of the capacitor. Furthermore, it is possible for only the surface to have pores and for the region following under the surface pores to be solid in construction. Such a situation is often observed if aluminium is used for the capacitor construction.

The often porous electrode bodies produced in this manner are then oxidized, for example, in a suitable electrolyte, such as e.g. phosphoric acid or an aqueous solution of ammonium adipate, by application of a voltage, in order to form the dielectric. The level of this forming voltage depends on the oxide layer thickness to be achieved or the later use voltage of the capacitor. Preferred forming voltages are in a range of from 1 to 1000 V, particularly preferably in a range of from 5 to 200 V, more particularly preferably in a range of from 10 to 100 V and most preferably in a range of 20 to 70 V.

The as a rule porous electrode bodies employed preferably have a porosity of from 10 to 90%, preferably from 30 to 80%, particularly preferably from 50 to 80% and an average pore diameter of from 10 to 10,000 nm, preferably from 50 to 5,000 nm, particularly preferably from 100 to 3,000 nm.

If the layer composition according to the invention is an aluminium wound capacitor or part of such, an anode body is provided as the substrate as follows: in process step a), a porous aluminium foil is formed anodically as the electrode material, whereby an aluminium oxide coating is formed as the dielectric. The aluminium foil (anode foil) obtained in this manner is then provided with a contact wire and wound up with a further aluminium foil (cathode foil) likewise provided with a contact wire, these two foils being spaced from one another by one or more separator papers, which are based e.g. on cellulose or, preferably, on synthetic papers. After being wound up, the anode bodies obtained in this way are fixed, for example by means of an adhesive tape. The separator paper or papers can be carbonized by heating in an oven. This method and manner of production of anode bodies for aluminium wound capacitors is adequately known from the prior art and is described, for example, in U.S. Pat. No. 7,497,879 B2.

In process step b) of the process according to the invention, a stabilized electrically conductive polymer layer comprising an electrically conductive polymer is then formed on at least a part of the substrate surface, the formation of the stabilized electrically conductive polymer layer comprising the process steps:

b1) formation of an electrically conductive polymer layer comprising an electrically conductive polymer on at least a part of the substrate surface;

b2) application of a liquid stabilizer phase, comprising at least one stabilizer and at least one solvent or dispersant, onto the electrically conductive polymer layer obtained in process step b1) for the formation of a stabilizer layer, wherein the at least one stabilizer is gallic acid, a flavonoid or a mixture thereof.

For the formation of an electrically conductive polymer layer comprising an electrically conductive polymer on in process step b1), a solution or dispersion of precursors of conductive polymers (called precursors in the following), a solution of conductive polymers or a dispersion which contains particles of an electrically conductive polymer (preferably with a dispersing agent) are applied onto the substrate. If anode bodies are used as the substrate, the precursors, the solution or dispersion are introduced into the porous region of the anode body. In general, dispersions which contain particles of an electrically conductive polymer can be employed. However, according to a particular embodiment of the process according to the present invention in process step b) the stabilized electrically conductive layer comprising the electrically conductive polymer is formed in situ on at least a part of the substrate surface.

The above-mentioned solutions or dispersions are applied to the substrate surface by known processes, e.g. immersion, dipping, pouring, dripping on, spraying, misting on, knife coating, brushing or printing, for example ink-jet, screen or tampon printing. For anode bodies, the application is preferably carried out by dipping the anode body provided in process step a) into the solution or dispersion and thus impregnating it with this solution or dispersion. The dipping into or the impregnation is preferably carried out for a period in a range of from 1 second to 120 minutes, particularly preferably in a range of from 10 seconds to 60 minutes and most preferably in a range of from 30 seconds to 15 minutes. The introduction of the solution or dispersion into the anode body can be facilitated, for example, by increased or reduced pressure, vibration, ultrasound or heat. These conditions are also preferred for other layer compositions.

The solutions or dispersions comprising conductive polymers or the precursors preferably have a content of stabilizers of less than 0.2 wt. %, particularly preferably of less than 0.1 wt. %, very particularly preferably of less than 0.01 wt. %, in each case based on the total weight of the solution or dispersion. The solutions or dispersions extremely preferably contain no stabilizers. Stabilizers in the solution or dispersion easily lead to an undesirable decrease in the storage stability of the solution or dispersions containing conductive polymers or precursors of conductive polymers.

The application of the precursors, solutions or dispersions can be carried out directly on to the substrate or using an adhesion promoter, for example a silane, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, and/or one or more other functional layers.

If anode bodies are used as the substrate, as a result of the application the solutions or dispersion preferably covers the pores of the porous region rather less. Rather, the surfaces of the cavities of the pores are at least partly coated with the dispersion. The particles present in the dispersion thus not only form a layer covering the openings of the pores; at least parts and often also all regions of the surface of the pores are also covered with a layer of the particles of the dispersion, as a result of which these particles are introduced into the anode body.

Corresponding monomers, for example, are understood as precursors for the preparation of conductive polymers. Mixtures of various precursors can also be used. Suitable monomeric precursors are, for example, optionally substituted thiophenes, pyrroles or anilines, preferably optionally substituted thiophenes, particularly preferably optionally substituted 3,4-alkylenedioxythiophenes.

The term "polymers" as used in the context of the present invention includes, in the context of the invention, all compounds with more than one identical or different recurring unit.

Here in particular, "conductive polymers" are understood as meaning the compound class of π-conjugated polymers which have an electrical conductivity after oxidation or reduction. Preferably, conductive polymers are understood as meaning those π-conjugated polymers which, after oxidation, have an electrical conductivity of the order of at least $0.1\ S\ cm^{-1}$.

The electrically conductive polymer preferably comprises at least one polythiophene, polypyrrole or polyaniline, which are optionally substituted. Particularly preferably, the electrically conductive polymer comprises at least one polythiophene. Preferred polythiophenes are those with repeat units of the general formula (I), of the general formula (II), of the general formula (III) or polythiophenes comprising combinations of these repeat units:

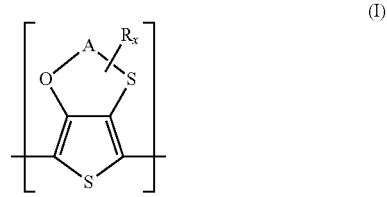

(I)

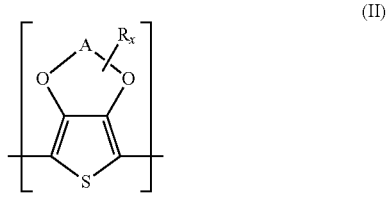

(II)

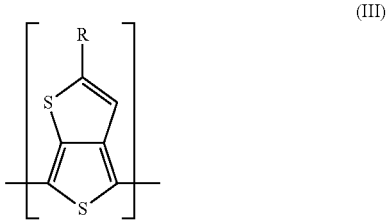

(III)

in which

A is an optionally substituted $C_1$-$C_5$-alkylene radical,

R is independently H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x is an integer from 0 to 8 and, in the case that a plurality of R radicals are bonded to A, they may be the same or different.

The general formulae (I) and (II) should be understood such that x substituents R may be bonded to the alkylene radical A.

Particular preference is given to polythiophenes with repeat units of the general formula (I) or (II) or repeat units of the general formulae (I) and (II), in which A is an optionally substituted $C_2$-$C_3$-alkylene radical and x is 0 or 1. A very particularly preferred polythiophene is poly(3,4-ethylenedioxythiophene) (PEDOT), which is optionally substituted, as in poly(4-[(2,3-dihydrothieno[3,4-b]-[1,4]dioxin-2-yl)methoxy]propane-1-sulfonic acid), poly(4-[(2,3-dihydrothieno[3,4-b][1,4]dioxin-2-yl)methoxy]butane-1-sulfonic acid) (PEDOT-S) or poly(4-[(2,3-dihydrothieno[3,4-b][1,4]dioxin-2-yl)methoxy]butane-2-sulfonic acid).

In the context of the invention, the prefix "poly" should be understood to mean that more than one identical or different repeat unit is present in the polymer or polythiophene. The polythiophenes contain a total of n repeat units of the general formula (I) or of the general formula (II) or of the general formula (III) or of the general formulae (I) and (II) or of the general formulae (I) and (III) or of the general formulae (II) and (III) or of the general formulae (I), (II) and (III), where n is an integer of 2 to 2000, preferably 2 to 100. The repeat units of the general formula (I) or of the general formula (II) or of the general formula (III) or the repeat units of the general formulae (I) and (II) or the repeat units of the general formulae (I) and (III) or the repeat units of the general formulae (II) and (III) or the repeat units of the general formulae (I), (II) and (III) may each be the same or different within a polythiophene. Preference is given to polythiophenes having in each case identical repeat units of the general formula (I) or of the general formula (II) or of the general formula (III) or having in each case identical repeat units of the general formulae (I) and (II), or of the general formulae (I) and (III), or of the general formulae (II) and (III), or having in each case identical repeat units of the general formulae (I), (II) and (III). Particular preference is given to polythiophenes having in each case identical repeat units of the general formula (I) or of the general formula (II) or having in each case identical repeat units of the general formulae (I) and (II). At the end groups, the polythiophenes preferably each bear H.

In the context of the invention, $C_1$-$C_5$-alkylene radicals A are preferably methylene, ethylene, n-propylene, n-butylene or n-pentylene. $C_1$-$C_{18}$-Alkyl R is preferably linear or branched $C_1$-$C_{18}$-alkyl radicals such as methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R are, for example, cyclopentyl, cyclohexyl, cycloheptyl, cyclooctyl, cyclononyl or cyclodecyl, $C_6$-$C_{14}$-aryl radicals R are, for example, phenyl or naphthyl, and $C_7$-$C_{18}$-aralkyl radicals R are, for example, benzyl, o-, m-, p-tolyl, 2,3-, 2,4-, 2,5-, 2,6-, 3,4-, 3,5-xylyl or mesityl. The above list serves to illustrate the invention by way of example and should not be considered to be exclusive.

In the context of the invention, any further substituents of the A radicals and/or of the R radicals include numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic ester, carboxylic acid, carbonate, carboxylate, cyano, alkylsilane and alkoxysilane groups, and also carboxamide groups.

The polythiophenes may be uncharged or cationic. In preferred embodiments, they are cationic, "cationic" relating only to the charges which reside on the main polythiophene chain. According to the substituent on the R radicals, the polythiophenes may bear positive and negative charges in the structural unit, in which case the positive charges are on the main polythiophene chain and the negative charges are, if present, on the R radicals substituted by sulfonate or carboxylate groups. The positive charges of the main polythiophene chain may be partly or fully saturated by the anionic groups which may be present on the R radicals.

Viewed overall, the polythiophenes in these cases may be cationic, uncharged or even anionic. Nevertheless, in the context of the invention, all are considered to be cationic polythiophenes, since the positive charges on the main polythiophene chain are crucial. The positive charges are not shown in the formulae, since their exact number and position cannot be stated unambiguously. The number of positive charges is, however, at least 1 and at most n, where n is the total number of all repeat units (identical or different) within the polythiophene.

The positive charge of the polythiophenes can be balanced by sulfonate- or carboxylate-substituted and thus negatively charged R radicals (so called "self-doped polythiophenes") or by counter-ions (so called "foreign-doped-polythiophenes").

According to a first preferred embodiment of the polythiophenes which may be used for the formation of the electrically conductive polymer layer in process step b1), preferably for the formation of a solid electrolyte layer in a capacitor, the polythiophenes are self-doped polythiophenes that preferably comprise, to the extent of at least 50%, still more preferably to the extent of at least 75%, still more preferably to the extent of at least 95% and most preferably to the extent of 100%, recurring units of the formula (IV)

(IV)

in which
X, Y are identical or different and denote O, S, N—$R^1$,
Z denotes an organic residue carrying at least an anionic substituent, preferably a —$SO_3^-M^+$ group in which $M^+$ denotes a cation, such as $Li^+$, $Na^+$, $K^+$ or $NH_4^+$, wherein Z preferably denotes —$(CH_2)_m CR^2R^3$—$(CH_2)_n$—,
$R^1$ denotes aryl, $C_1$-$C_{18}$-alkyl or hydrogen,
$R^2$ denotes hydrogen, —$(CH_2)_s$—O—$(CR^4{}_2)_p$—$SO_3^-M^+$ or —$(CH_2)_p$—$SO_3^-M^+$,
$R^3$ denotes —$(CH_2)_s$—O—$(CR^4{}_2)_p$—$SO_3^-M^+$ or —$(CH_2)_p$—$SO_3^-M^+$,
$M^+$ denotes a cation,
m, n are identical or different and denote an integer from 0 to 3,
$R^4$ denotes hydrogen or a $C_1$-$C_{10}$ alkyl group, preferably a methyl group,
s denotes an integer from 0 to 10 and
p denotes an integer from 1 to 18.

The percentage figures stated above are intended in this context to express the numerical content of the units of the structural formula (IV) in the total number of monomer units in the self-doped conductive polymer.

Suitable cations $M^+$ are e.g. $H^+$, $Li^+$, $Na^+$, $K^+$, $Rb^+$, $Cs^+$ and $NH_4^+$. Particularly suitable cations are $Na^+$ and $K^+$.

Particularly preferred monomers of the structural formula (IV) are those in which
X, Y denote O,
Z denotes —$(CH_2)_m CR^2R^3$—$(CH_2)_n$—,
$R^2$ denotes hydrogen or —$(CH_2)_s$—O—$(CH_2)_p$—$SO_3^-M^+$, —$(CH_2)_p$—$SO_3^-M^+$ or —$(CH_2)_s$—O—$(CH_2)_p$—$CHR^4$—$SO_3^-M^+$, $R^3$ denotes $-(CH_2)_s-O-(CH_2)_p-SO_3^-M^+$, $-(CH_2)_p-SO_3^-M^+$ or $-(CH_2)_s(CH_2)_p-CHR^4-SO_3^-M^+$, $M^+$ denotes a cation, m, n are identical or different and denote an integer from 0 to 3, $R^4$ denotes hydrogen a methyl group or an ethyl group;

s denotes an integer from 0 to 10 and p denotes an integer from 1 to 18.

Very particularly preferred monomers of the structural formula (IV) are those in which X, Y denote O, Z denotes $-(CH_2)-CR^2R^3-(CH_2)_n-$, $R^2$ denotes hydrogen, $R^3$ denotes $-(CH_2)_s-O-(CH_2)_p-SO_3^-M^+$, $-(CH_2)_p-SO_3^-M^+$, or $-(CH_2)_s(CH_2)_p-CH(CH_3)-SO_3^-M^+$ or $-(CH_2)_s-O-(CH_2)_p-CH(CH_2CH_3)-SO_3^-M^+$, $M^+$ denotes $Na^+$ or $K^+$, n denotes 0 or 1, s denotes 0 or 1 and p denotes 2, 3, 4 or 5.

Suitable Examples of self-doped polymers are disclosed in WO-A-2014/048562 and in US-A-2015/0337061. Concrete examples of very particularly preferred self-doped conductive polymers include poly(4-[(2,3-dihydrothieno[3,4-b]-[1,4]dioxin-2-yl)methoxy]propane-1-sulfonic acid), poly(4-[(2,3-dihydrothieno[3,4-b][1,4]dioxin-2-yl)methoxy]butane-1-sulfonic acid) (PEDOT-S), poly(4-[(2,3-dihydrothieno[3,4-b][1,4]dioxin-2-yl)methoxy]butane-2-sulfonic acid) or a mixture thereof.

According to a second preferred embodiment of the polythiophenes which may be used for the formation of the electrically conductive polymer layer in process step b1), preferably for the formation of a solid electrolyte layer in a capacitor, the polythiophenes are foreign-doped polythiophenes that preferably comprise monomeric or polymeric counter-ions to balance the positive charges, the latter also being referred to hereinafter as polyanions.

If a solution or dispersion comprising a conductive polymer is used for the formation of the electrically conductive polymer layer, polymeric anions are preferred over monomeric anions, since they contribute to film formation and, owing to their size, lead to thermally more stable, electrically conductive films. Polymeric anions here may, for example, be anions of polymeric carboxylic acids, such as polyacrylic acids, polymethacrylic acid or polymaleic acids, or polymeric sulfonic acids, such as polystyrenesulfonic acids and polyvinylsulfonic acids. These polycarboxylic and -sulfonic acids may also be copolymers of vinylcarboxylic and vinylsulfonic acids with other polymerizable monomers, such as acrylic esters and styrene.

A preferred polymeric anion in the conjugated polymer b) is an anion of a polymeric carboxylic or sulfonic acid. A particularly preferred polymeric anion is the anion of polystyrenesulfonic acid (PSS) or a derivative thereof.

The molecular weight of the polyacids which afford the polyanions is preferably 1,000 to 2,000,000, more preferably 2,000 to 500,000. The polyacids or alkali metal salts thereof are commercially available, for example polystyrenesulfonic acids and polyacrylic acids, or else are preparable by known processes (see, for example, Houben Weyl, Methoden der organischen Chemie [Methods of Organic Chemistry], vol. E 20 Makromolekulare Stoffe [Macromolecular Substances], part 2, (1987), p. 1141 ff.).

Polymeric anion(s) and electrically conductive polymers may be present in the dispersion a) especially in a weight ratio of 0.5:1 to 50:1, preferably of 1:1 to 30:1, more preferably 1.5:1 to 10:1. The weight of the electrically conductive polymers corresponds here to the initial weight of the monomers used, assuming that there is full conversion in the polymerization.

The monomeric anions used are, for example, those of $C_1$-$C_{20}$-alkanesulfonic acids, such as those of methanesulfonic acid, ethanesulfonic acid, propanesulfonic acid, butanesulfonic acid or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids, such as trifluoroacetic acid or perfluorooctanoic acid, and aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid, or tetrafluoroborates, hexafluorophosphates, perchlorates, hexafluoroantimonates, hexafluoroarsenates or hexachloroantimonates. Preferred monomeric anions are the anions of p-toluenesulfonic acid, methanesulfonic acid or camphorsulfonic acid.

A concrete example of very particularly preferred foreign-doped conductive polymer is a complex of poly(3,4-ethylenedioxythiophene) and polystyrenesulfonic acid (PEDOT/PSS).

For the formation of the solid electrolyte layer a solution or dispersion comprising the conductive polymer, such as a PEDOT/PSS-dispersion or a PEDOT-S-solution, can be introduced into the electrode body, followed by an at least partial removal of the solvent or dispersant for the formation of a solid electrolyte layer. This step can be repeated for several times until the desired thickness of the solid electrolyte layer is obtained. Moreover, it is also possible to form a solid electrolyte layer by polymerizing the monomers used to prepare the conductive polymer, such as 3,4-ethylenedioxythiophene, within the electrode body in a so-called in situ-polymerization process. It may also be advantageous to use a combination of a foreign-doped polythiophene, such as PEDOT/PSS, and a self-doped polythiophene, such as PEDOT-S, for the formation of a solid electrolyte layer as this is disclosed, for example, in WO-A-2014/048562.

The particles, in particular the particles of the conductive polymer, of the solution or dispersion comprising the conductive polymer preferably have a specific electrical conductivity of greater than 100 S/cm when used for layer compositions in capacitors. In this context, the specific electrical conductivity of the particles is the specific electrical conductivity of the film in the dried state, which forms from the particles on drying of the solution or dispersion. Preferably, solutions or dispersions in which the particles have a specific electrical conductivity of greater than 150 S/cm, particularly preferably greater than 250 S/cm, very particularly preferably greater than 400 S/cm, extremely preferably greater than 750 S/cm are employed. In some cases, particles with a specific conductivity of a maximum of 5,000 S/cm are also employed.

In a particular variant of the process according to the invention, the particles, in particular the particles of the conductive polymer, in the solution or dispersion have a diameter $d_{50}$ in a range of from 1 to 100 nm, preferably in a range of 1 to below 70 nm, preferably in a range of from 1 to 50 nm, particularly preferably in a range from 1 to 40 nm and more particularly preferably in a range of from 5 to 30 nm. The diameter of the particles is determined via an ultracentrifuge measurement. In a preferred variant of the process according to the invention, the particles, in particular of the conductive polymer, in the solution or dispersion preferably have a $d_{90}$ value of the diameter distribution of less than 150 nm, particularly preferably less than 100 nm, very particularly preferably less than 50 nm. In a preferred variant of the process according to the invention, the particles, in particular of the conductive polymer, in the solution or dispersion have a $d_{10}$ value of the diameter distribution of greater than 1 nm, particularly preferably greater than 3 nm, very particularly preferably greater than 5 nm.

The particle size of the particles, in particular of the particulate conductive polymers, in the dispersion can be reduced, for example, by means of a high-pressure homogenizer. This operation can also be repeated in order to magnify the effect. Pressures of between 100 and 2,000 bar in particular have proved to be advantageous for greatly reducing the particle size. Preparation of a polythiophene/polyanion complex and subsequent dispersion or redispersion in one or more solvent(s) is also possible.

The solution or dispersion preferably has a purity with respect to metals and transition metals as described in the specification WO 2010/003874 A2 on p. 6, 1. 10-29. The low concentrations of metals in the dispersions have the great advantage that when used for capacitors, the dielectric is not damaged during formation of the solid electrolyte and in later operation of the capacitor.

The solutions or dispersions of the electrically conductive polymer comprise one or more solvents or dispersing agents, preferred solvents or dispersing agents being water, organic solvents or mixtures of an organic solvent and water. Solvents or dispersing agents which may be mentioned are, for example, the following solvents: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulphoxides and sulphones, such as dimethylsulphoxide and sulpholane; aliphatic carboxylic acid amides, such as methylacetamide, dimethylacetamide and dimethylformamide; aliphatic and araliphatic ethers, such as diethyl ether and anisole. Water or a mixture of water with the abovementioned organic solvents can furthermore also be used as the solvent or dispersing agent.

Preferred solvents and dispersing agents comprising conductive polymers are water or other protic solvents, such as alcohols, e.g. methanol, ethanol, i-propanol and butanol, and mixtures of water with these alcohols, water being the particularly preferred solvent and dispersing agent.

The solutions or dispersions comprising conductive polymers can moreover comprise further components, such as surface-active substances, e.g. ionic and nonionic surfactants, or adhesion promoters, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane-polyurethanes, polyacrylates or polyolefin dispersions.

Preferably, the solutions or dispersions comprising conductive polymers comprise further additives which increase the conductivity, such as e.g. compounds comprising ether groups, such as e.g. tetrahydrofuran, compounds comprising lactone groups, such as γ-butyrolactone, γ-valerolactone, compounds comprising amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as e.g. sulpholane (tetramethylene sulphone), dimethylsulphoxide (DMSO), sugars or sugar derivatives, such as e.g. sucrose, glucose, fructose, lactose, sugar alcohols, such as e.g. sorbitol, mannitol, furan derivatives, such as e.g. 2-furancarboxylic acid, 3-furancarboxylic acid, and/or di- or polyalcohols, such as e.g. ethylene glycol, glycerol, di- and triethylene glycol, di- and polyglycerols. Ethylene glycol, dimethylsulphoxide or polyglycerols are particularly preferably employed as conductivity-increasing additives.

The solutions or dispersions containing conductive polymers can moreover contain one or more organic binders which are soluble in organic solvents, as described in WO 2009/141209 A1 on p. 12, 1. 16-34. The solutions or dispersions can have a pH of from 1 to 14, a pH of from 1 to 8 being preferred. When employed in capacitors, dispersions with a pH of from 2.5 to 8 are preferred for corrosion-sensitive dielectrics, such as, for example, aluminium oxides or niobium oxides, so that the dielectric is not damaged.

To adjust the pH, for example, bases or acids can be added to the solutions or dispersions comprising conductive polymers, as described in WO 2010/003874 A2 on p. 4, 1. 13-32. Those additions which do not impair the film formation of the dispersions and are not volatile at higher temperatures, e.g. soldering temperatures, but remain in the solid electrolyte under these conditions, such as e.g. the bases 2-dimethylaminoethanol, 2,2'-iminodiethanol or 2,2',2''-nitrilotriethanol and the acid polystyrenesulphonic acid, are preferred.

The viscosity of the solution or dispersion containing conductive polymers can be between 0.1 and 1,000 mPa·s (measured with a rheometer at 20° C. and a shear rate of 100 $s^1$), depending on the method of application. Preferably, the viscosity is 1 to 200 mPa·s, particularly preferably between 10 to 150 mPa·s, very particularly preferably 10 to 100 mPa·s.

The solids content of the solutions or dispersion employed in process step b1) is preferably in a range of from 1 to 30 wt. %, particularly preferably in a range of from 1 to 20 wt. % and most preferably in a range of from 1 to 10 wt. %, in each case based on the total weight of the dispersion. The solids content is determined via drying of the dispersion at a temperature which is sufficiently high to remove the dispersing agent, but does not thereby decompose the solid.

After the solutions or dispersion described above have been applied to the substrate surface, the solvent or dispersion is at least partially removed for the formation of an electrically conductive polymer layer. The at least partial removal is preferably accomplished by the drying the substrate coated with the solutions or dispersions of the electrically conductive polymer at a temperature in a range of from 20° C. to 200° C., particularly preferably in a range of from 50° C. to 175° C. and most preferably in a range of from 80° C. to 150° C.

In addition to the approach described above, the electrically conductive polymer layer in process step b1) can also be prepared in situ on the substrate surface, i.e. by polymerization of the conductive polymer precursors, such as EDOT-monomers, on the surface of the substrate. For this, corresponding monomers and oxidizing agents are preferably applied to the substrate together or in succession. All the metal salts known to the person skilled in the art which are suitable for oxidative polymerization of thiophenes, anilines or pyrroles can be used as the oxidizing agent. Also suitable are metal-free oxidizing agents, such as inorganic or organic peroxides.

Suitable metal salts are metal salts of main group or sub-group metals, the latter also being called transition metal salts in the following, of the periodic table of the elements. Suitable transition metal salts are, in particular, salts of an inorganic or organic acid or inorganic acids of transition metals comprising organic radicals, such as e.g. with iron(III), copper(II), chromium(VI), cerium(IV), manganese(IV), manganese(VII) and ruthenium(III). Preferred transition metal salts are those of iron(III). Iron(III) p-toluenesulphonate, iron(III) o-toluenesulphonate or a mixture of iron(III) p-toluenesulphonate and iron(III) o-toluenesulphonate are very particularly preferred as metal salts.

In the case of capacitors, the at least partial removal of the solvent or dispersant leads to the formation of a solid electrolyte layer as the polymer layer that is prepared in process step b1), which completely or partly covers the dielectric. In this context it is preferable for the covering of the dielectric by the solid electrolyte to be preferably at least 50%, particularly preferably at least 70% and most preferably at least 80%, it being possible for it to be determined by measurement of the capacitance of the capacitor in the dry and in the moist state at 120 Hz, as is described in DE-A-10 2005 043 828.

In process step b1) the application of the solutions or dispersions comprising the electrically conducive polymer and the subsequent removal of at least a part of the solvent or dispersion can also be repeated once or several times, in order in this manner to adapt the thickness of the layer of the solid electrolyte deposited on the dielectric or the degree of filling of the electrolyte in the anode body to the particular requirements.

In process step b2) of the process according to the present invention a liquid stabilizer phase, comprising at least one stabilizer and at least one solvent or dispersant, is applied onto the electrically conductive polymer layer obtained in process step b1) for the formation of a stabilizer layer, wherein the at least one stabilizer is gallic acid, a flavonoid or a mixture thereof.

According to a particularly preferred embodiment of the process according to the present invention, the stabilizer is a flavonoid. Flavonoids in the sense of the present invention preferably comprise a 15-carbon skeleton, which consists of two phenyl rings connected by a 3-carbon linking chain. They are therefore also depicted as C6-C3-C6 compounds. Depending on the chemical structure, degree of oxidation, and unsaturation of the linking chain (C3), flavonoids can be classified into different groups. Preferably, such as flavanols, flavanonols, chalcones, anthocyanidins, flavonols, aurones, flavones, flavanones and isoflavones.

Suitable flavonoids that can be used as stabilizer in the process according to the present invention comprise Catechin, Gallocatechin, Epicatechin, Taxifolin, Isoliquiritigenin, Xanthohumol, Cyanidin, Delphinidin, Malvidin, Pelargonidin, Peonidin, Petunidin, Morin, Quercetin, Kaempferol, Myricetin, Fisetin, Aureusidin, Luteolin, Apigenin, Hesperetin, Naringenin, Eriodictyol, Genistein, Daidzein and Licoricidin, Chrysin, Galangin, Robinetin, Gossypetin, wherein the use of a flavanonol or a flavanone is particularly preferred.

According to a particularly preferred embodiment of the process according to the present invention, the flavonoid selected from the group consisting of a flavanonol, a flavanone and a mixture thereof, even more preferably the stabilizer is a flavanone, even more preferably an flavanone selected from the group consisting of Hesperetin, Naringenin, Eriodictyol and mixtures thereof and most preferably the stabilizer is Naringenin (either as an enantiomer mixture (CAS 67604-48-2) or in form of the pure (S)- or (R)-enantiomer, preferably in the form of the (S)-enantiomer (CAS 480-41-1)):

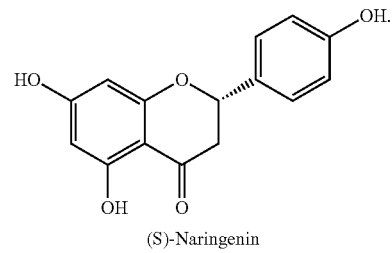 [SMILES: O=C1C[C@@H](c2ccc(O)cc2)Oc2cc(O)cc(O)c21]

(S)-Naringenin

According to a further particular embodiment of the process according to the present invention, the stabilizer is gallic acid.

In process step b2) the liquid stabilizer phase can be applied to the electrically conductive polymer layer obtained in process step b1) by known processes, e.g. immersion, dipping, pouring, dripping on, spraying, misting on, knife coating, brushing or printing, for example ink-jet, screen or tampon printing. If used for capacitors, the application is preferably carried out by dipping the anode body provided in process step b1) into the liquid stabilizer phase and thus impregnating it with the stabilizer. The dipping into or the impregnation with the stabilizer phase is preferably carried out for a period in a range of from 1 second to 120 minutes, particularly preferably in a range of from 10 seconds to 60 minutes and most preferably in a range of from 30 seconds to 15 minutes. The application of the liquid stabilizer phase comprising the stabilizer to the capacitor body can be facilitated, for example, by increased or reduced pressure, vibration, ultrasound or heat.

In connection also with the solvent or dispersant used in the liquid stabilizer phase, it is preferable to use the solvents and dispersants contained in the above paragraphs for use for the conductive polymer. This also applies for the liquids mentioned there as preferred. It is thus preferable for the liquid stabilizer phase in process step b2) to contain water, an ether alcohol or an alcohol or a mixture thereof. Generally, the stabilizer and the solvent or dispersant differ from one another.

All the solvents and dispersants known to the person skilled in the art in which the corresponding stabilizers can be dissolved or dispersed, preferably dissolved, and with which the capacitor body can be impregnated can be used as the solvent or dispersant in process step b2). The use of water, an ether alcohol or an alcohol or a mixture thereof as the liquid phase is particularly preferred according to the invention.

The concentration of the stabilizer in the liquid stabilizer phase used in process step b2) is often in a range of from 0.01 to 99 wt. %, preferably in a range of from 0.1 to 50 wt. %, particularly preferably in a range of from 1 to 25 wt. % and most preferably in a range of from 2 to 10 wt. %, in each case based on the liquid stabilizer phase.

The liquid stabilizer phase used in process step b2) preferably contains less than 0.5 wt. %, preferably less than 0.1 wt. %, particularly preferably less than 0.01 wt. % and very particularly preferably 0 wt. %, in each case based on the weight of the stabilizer phase, of an electrically conductive polymer. The presence of conductive polymers in the liquid stabilizer phase lowers the storage stability thereof.

In process according to the present invention it is preferable, after application of the stabilizer phase in process step b2), for the solvent or dispersant to be at least partly removed in a further process step b3). It is preferable here that the solvent or dispersant is removed to the extent of at least 70 wt. %, preferably at least 90 wt. % and particularly preferably to the extent of at least 98 wt. %, in each case based on the amount of solvent or dispersant employed in process step b2). The solvent or dispersant is often also removed virtually completely. In the case of capacitors, for example, this removal is preferably carried out by removing the capacitor body comprising the polymer layer from the liquid stabilizer phase and drying it. The drying is preferably carried out at a temperature in a range of from 20° C. to 200° C., particularly preferably in a range of from 50° C. to 175° C. and most preferably in a range of from 75° C. to 150° C. and for a period in a range of from 1 minute to 120 minutes, particularly preferably in a range of from 5 minutes to 90 minutes and most preferably in a range of from 10 minutes to 60 minutes. These conditions are also preferred for other layer compositions.

After the formation of the stabilized electrically conductive layer in process step b) of the process according to the present invention, the electrolyte capacitors can be finished in the manner known to the person skilled in the art. In the case of a tantalum electrolyte capacitor, the capacitor bodies can be covered, for example, with a graphite layer and a silver layer, as is known from DE-A-10 2005 043 828, while in the case of an aluminium wound capacitor, in accordance with the teaching of U.S. Pat. No. 7,497,879 B2, the capacitor body is incorporated in an aluminium beaker, provided with a sealing inspection glass or rubber and firmly closed mechanically by crimping. The capacitor can then be freed from defects in the dielectric in a known manner by ageing.

A further contribution towards achieving at least one of the objects of the present invention is made by a layer composition obtainable by the process according to the present invention.

A further contribution towards achieving at least one of the objects of the present invention is also made by a layer composition comprising S1. a substrate with a substrate surface;
S2. a stabilized electrically conductive polymer layer following the substrate surface, wherein the stabilized electrically conductive polymer layer comprises:
  S2a. an electrically conductive polymer layer following the substrate surface and comprising an electrically conductive polymer, preferably a polythiophene;
  S2b. a stabilizer layer following the electrically conductive polymer layer and comprising at least one stabilizer, wherein the at least one stabilizer is gallic acid, a flavonoid or a mixture thereof, preferably a flavonoid, more preferably a flavonoid selected from the group consisting of a flavanonol, a flavanone and a mixture thereof, even more preferably a flavanone, even more preferably an flavanone selected from the group consisting of Hesperetin, Naringenin, Eriodictyol and mixtures thereof and most preferably Naringenin.

Here and generally, regions and in particular layers can follow one another directly or also indirectly, spaced by further layers. It is furthermore to be noted that the above statements of this text also apply to this layer composition. It is preferable for the layer composition to be a capacitor. In this, the polymer layer is on the anode body.

Preferred electrically conductive polymers and preferred stabilizers are those electrically conductive polymers and stabilizers that have been described as preferred embodiments in connection with the process for the production of a layer composition according to the present invention.

The layer compositions according to the invention are outstandingly suitable for use as electronic components, in particular as conductive or antistatic means, as transparent heating, as optionally transparent electrodes, as hole-injecting or hole conducting layers in organic light-emitting diodes, for through-contacting of circuit boards or as a solid electrolyte in electrolyte capacitors. They can advantageously be transparent.

Layer compositions according to the invention can be employed as electronic components, for example also on films, packaging of electronic components, for finishing films of plastics and for coating screens. They can furthermore be used as cathode materials in capacitors, as transparent electrodes e.g. in displays, for example as a substitute for indium-tin oxide electrodes, or as electrical conductors in polymeric electronics. Further possible uses are sensors, batteries, solar cells, electrochromic windows (smart windows) and displays and corrosion protection.

The layer compositions according to the invention are preferably used in capacitors. Such capacitors are preferably employed in electronic circuits, for example as a filter capacitor or decoupling capacitor. Electronic circuits such as are found, for example, in computers (desktop, laptops, servers), in computer peripherals (e.g. PC cards), in portable electronic equipment, such as e.g. mobile telephones, digital cameras or electronic devices for entertainment, in electronic devices for entertainment, such as e.g. in CD/DVD players and computer games consoles, in navigation systems, in telecommunications installations, in domestic appliances, in medical technology, e.g. for defibrillators, in power supplies, such as those based on renewable energy, or in automobile electronics, such as e.g. for hybrid or electric automobiles, are preferred.

The invention is now explained in more detail with the aid of non-limiting figures and examples.

FIG. 1 is a schematic diagram of a section through a part of a capacitor as an example of a layer composition according to the invention. This has an electrode body 1, usually made of a porous electrode material 2, such as tantalum. On the electrode surface 4 of the electrode material 2, a dielectric 3 is formed as a thin layer, so that an anode body which is still porous and comprises the electrode body 1 of the electrode material 2 and the dielectric 3 is formed and, in the context of the layer composition according to the invention, can be regarded as the substrate, the surface of the anode body 4 representing a substrate surface 11 according to the invention. The dielectric 3 is followed, optionally after further layers, by a layer of a solid electrolyte 5 (e.g. of PEDOT/PSS particles, an in situ-produced PEDOT-layer or a combination thereof), whereby a capacitor body 6 comprising the electrode body 1 of the electrode material 2, the dielectric 3 and the solid electrolyte 5 is formed. The solid electrolyte 5 is followed by a layer 14 of a stabilizer 7, preferably a layer of Naringenin, the solid electrolyte layer 5 and the stabilizer layer 14 together forming the stabilized electrically conductive layer 12. The stabilizer 7 can be introduced into the capacitor body 6, for example, such that it completely or partly fills the pores 8.

FIG. 2 shows the structure of a layered composition 9 according to the invention, for example an antistatic film, in a more general form. On a substrate 10, in the case of the antistatic film often a PE, PP or PET layer, there is on the substrate surface 11 thereof an electrically conductive polymer layer 13 comprising an electrically conductive polymer. On the electrically conductive polymer layer 13, a stabilizer layer 14 with stabilizer 7, preferably a layer comprising Naringenin, is formed. The electrically conductive polymer layer 13 and the stabilizer layer 14 together forming the stabilized electrically conductive polymer layer 12.

MEASUREMENT METHODS

Surface Resistance:

The surface resistance (SR) of the coatings was determined by means of the four-point measurement method (four-point probe, Mitsubishi Chemical Analytech, Loresta-AX MCP-T370) and stated in ohms/square. A mean value for the surface resistance was obtained from measuring at three different spots on the same sample.

Solids Content:

For determination of the solids content, 5 g of the dispersion were dried at 100° C. for 14 hours and the solids content was ascertained via the difference in weight.

Capacitance and Dissipation Factor (DF):

The capacitance (in microfarads) and the DF (in %) were determined at 20° C. at 120 Hz by means of an LCR meter (Agilent 4263B).

Equivalent Series Resistance (ESR):

The ESR (in milliohm) was determined at 20° C. at 100 kHz by means of an LCR meter (Agilent 4263B).

Mean:

Unless specified otherwise here, the mean is the arithmetic mean.

EXAMPLES

Example 1: Preparation of Stabilizer Solutions 5 g of the respective stabilizer (listed in table 1) and 95 g of ethanol were mixed intensively in a glass beaker with a stirrer.

TABLE 1

| stabilizer solutions | |
|---|---|
| | stabilizer |
| stabilizer solution 1 | Tannic acid |
| stabilizer solution 2 | Propyl gallate |
| stabilizer solution 3 | Naringenin |
| stabilizer solution 4 | Gallic acid |
| stabilizer solution 5 | Myrecitin |
| stabilizer solution 6 | Quercitin |
| stabilizer solution 7 | (+)-Taxifolin |
| stabilizer solution 8 | (S)-Hesperitin |
| stabilizer solution 9 | Eriodictyol |

Example 2: Preparation of Layers by Means of In Situ Polymerization on Glass Substrates A solution was prepared consisting of 1 part by weight of 3,4-ethylenedioxythiophene (CLEVIOS™ M V2, Heraeus Deutschland GmbH & Co. KG) and 10 parts by weight of a 60 wt. % ethanolic solution of iron(III) p-toluenesulfonate (CLEVIOS™ C-E 60 High Fe, Heraeus Deutschland GmbH & Co. KG) and 5 parts by weight ethanol.

The solution was used to coat glass substrates. The glass substrates (5 cm×20 cm) were immersed into the solution with by means of dip coater for 1 minute. Following this they were dried at 125° C. for 60 minutes. Subsequently they were washed with deionized water, then with ethanol and then immersed consecutively 3 times in ethanol for 10 minutes each. Finally, they were dried for 15 minutes at room temperature and subsequently for 60 minutes at 125° C.

A coated glass substrate was then each immersed in a stabilizer solution of Example 1 for 10 minutes and thereafter dried for 15 minutes at room temperature and subsequently for 15 minutes at 125° C.

Example 3: Evaluation of the Stabilizers

The coated glass substrates prepared according to Example 2 were then subjected to storage tests. The different applied storage conditions were as follows: (A) 85° C. at 85% relative humidity; (B) 105° C.; (C) 125° C. The applied storage condition and storage time for each example are listed in table 2.

The increase in surface resistance after storage, i.e. the ratio of surface resistance after storage to surface resistance before storage (=increase in surface resistance after storage), are listed in table 2.

TABLE 2

| Evaluation of stabilizers | | | | |
|---|---|---|---|---|
| | stabilizer solution | storage condition | storage time [h] | increase in surface resistance after storage |
| example 3-1 | 3 | A | 164 | 3 |
| comparison example 3-1 | none | A | 164 | 65 |
| example 3-2 | 3 | A | 215 | 6 |
| comparison example 3-2 | 1 | A | 215 | 58 |
| example 3-3 | 3 | C | 576 | 1.5 |
| comparison example 3-3 | none | C | 576 | 780 |
| comparison example 3-4 | 1 | C | 576 | 10 |
| comparison example 3-5 | 2 | C | 576 | 18 |
| example 3-4 | 4 | A | 145 | 13 |
| comparison example 3-6 | none | A | 145 | 50 |
| example 3-5 | 3 | C | 141 | 1.4 |
| example 3-6 | 4 | C | 141 | 2.4 |
| comparison example 3-7 | none | C | 141 | 29 |
| example 3-7 | 3 | B | 1,000 | 1.2 |
| example 3-8 | 7 | B | 1,000 | 8 |
| example 3-9 | 8 | B | 1,000 | 3 |
| example 3-10 | 9 | B | 1,000 | 5 |
| example 3-11 | 6 | B | 1,000 | 14 |
| example 3-12 | 5 | B | 1,000 | 13 |
| comparison example 3-8 | none | B | 1,000 | 43 |

Example 4: Preparation of Tantalum Anodes

Tantalum powder with a specific capacitance of 30.000 µFV/g was pressed to pellets with incorporation of a tantalum wire and sintered in order to form an electrode body with the dimensions of 1.4 mm×2.8 mm×3.9 mm. 5 of these porous electrode bodies were anodized to 60 V in a phosphoric acid electrolyte to form a dielectric.

Example 5: Preparation of a PEDOT/PSS-Dispersion

A 2 L glass reactor with stirrer and thermometer was initially charged with 868 g of deionized water. 330 g of an aqueous polystyrenesulfonic acid solution with a mean molecular weight (weight average Mw) of 70,000 g/mol and a solids content of 3.8 wt. %. The reaction temperature was kept between 20° C. and 25° C. With stirring 5.1 g 3,4-ethylenedioxythiophene were added. The solution was stirred for 30 minutes. Subsequently. 0.03 g of iron(III) sulfate and 9.5 g of sodium persulfate were added and the solution was stirred for a further 24 hours. After the reaction had ended. 100 ml of a strongly acidic cation exchanger (Lewatit S100; Lanxess AG) and 250 ml of a weakly basic anion exchanger (Lewatit MP62; Lanxess AG) were added to remove inorganic salts. and the solution was stirred for a further 2 h. The ion exchangers were filtered off.

The PEDOT/PSS dispersion was homogenized ten times at a pressure of 700 bar with a high-pressure homogenizer. Subsequently, the dispersion was concentrated to a solids content of 2.5% and then homogenized five times at a pressure of 1,500 bar with a high-pressure homogenizer.

Subsequently. the dispersion was diluted to a solids content of 1.04% and 96 g of the diluted dispersion were admixed with 4 g of dimethyl sulfoxide (DMSO) and stirred intensively.

Example 6: Preparation of a PEDOT/PSS Dispersion for a Polymeric Outer Layer A 5 L glass reactor with stirrer and thermometer was initially charged with 1736 g of deionized water. 660 g of an aqueous polystyrenesulfonic acid solution with a mean molecular weight (weight average Mw) of 70,000 g/mol and a solids content of 3.8 wt. %. The reaction temperature was kept between 20° C. and 25° C. With stirring 10.2 g 3,4-ethylenedioxythiophene were added. The solution was stirred for 30 minutes. Subsequently. 0.06 g of iron(III) sulfate and 19 g of sodium persulfate were added and the solution was stirred for a further 24 hours. After the reaction had ended. 200 ml of a strongly acidic cation exchanger (Lewatit S100; Lanxess AG) and 500 ml of a weakly basic anion exchanger (Lewatit MP62; Lanxess AG) were added to remove inorganic salts. and the solution was stirred for a further 2 hours. The ion exchangers were filtered off. Subsequently, the dispersion was concentrated to a solids content of 1.5%.

In a beaker with a stirrer 160 g of this concentrated dispersion, 28 g of deionized water, 6 g of a sulfopolyester (Eastek 1100; solids content 30%; mean molecular weight 10,000-15,000 g/mol; Eastman), 8 g of dimethyl sulfoxide, 1 g of 3-glycidoxypropyltrimethoxysilane (Silquest A-187; OSi Specialities) and 0.4 g of wetting agent (Dynol 604; Air Products) were mixed vigorously for one hour.

Example 7: Preparation of a Crosslinking Agent Solution 4.0 g of p-toluenesulfonic acid monohydrate, 1.7 g of 1,10-diaminodecane and 95.5 g of water were mixed intensively in a glass beaker with a stirrer.

Example 8: Preparation of a Capacitor with Chemical In Situ Coating of the Tantalum Anodes A solution was prepared consisting of 1 wt. % of 3,4-ethylenedioxythiophene (CLEVIOS™ M V2; Heraeus Deutschland GmbH & Co. KG) and 20 wt. % of a 40 wt. % ethanolic solution of iron(III) p-toluenesulfonate (CLEVIOS™ C-E; Heraeus Deutschland GmbH & Co. KG).

The solution was used to impregnate the tantalum anodes of Example 4. The tantalum anodes were immersed in this solution and then exposed for 30 minutes at room temperature (20° C.) to an atmospheric relative humidity of 95%. Following this they were heat treated for 15 minutes at 50° C. and for 15 minutes at 150° C. in a drying oven. The tantalum anodes were then washed for 30 minutes in an aqueous 2 wt. % solution of p-toluenesulfonic acid. The tantalum anodes were re-formed for 30 minutes in a 0.25 wt. % aqueous solution of p-toluenesulfonic acid and then rinsed in distilled water and dried. The afore described impregnation, drying, temperature treatment and re-forming were repeated for further four times. The tantalum anodes were then immersed in a stabilizer solution of Example 1 for 10 minutes and thereafter dried for 15 minutes at room temperature and subsequently for 15 minutes at 120° C.

Subsequently, an impregnation into the solution from Example 7 for 1 minute was carried out, followed by drying at 120° C. for 10 minutes. After this an impregnation into the dispersion from Example 6 for 1 minute was carried out, followed by drying at 120° C. for 10 minutes. Subsequently, an impregnation into the solution from Example 7 for 1 min was carried out, followed by drying at 120° C. for 10 min. After this an impregnation into the dispersion from Example 6 for 1 min was carried out, followed by drying at 120° C. for 10 min. Subsequently, an impregnation into the solution from Example 7 for 1 minute was carried out, followed by drying at 120° C. for 10 minutes. After this an impregnation into the dispersion from Example 6 for 1 minute was carried out, followed by drying at 120° C. for 10 minutes.

The tantalum anodes were then coated with a graphite and subsequently with a silver layer and are from then on Tantalum capacitors.

The tantalum capacitors were then subjected to storage tests (150° C.). The increase in ESR after storage, i.e. the ratio of ESR after storage to ESR before storage, are listed in table 3.

TABLE 3

Evaluation of the tantalum capacitors

|  | stabilizer solution | storage time [h] | increase in ESR after storage |
|---|---|---|---|
| example 8-1 | 3 | 384 | 2.1 |
| example 8-2 | 4 | 384 | 2.4 |
| comparison example 8-1 | none | 384 | 9.0 |
| comparison example 8-2 | 1 | 384 | 3.8 |

Example 9: Preparation of a Capacitor with Polymer Dispersions

The tantalum anodes from Example 4 were impregnated in the dispersion from Example 5 for 1 minute. This was followed by drying at 120° C. for 10 minutes. This sequence of impregnation and drying was carried out nine further times.

The tantalum anodes were then immersed in a stabilizer solution of Example 1 for 10 minutes and thereafter dried for 15 minutes at room temperature and subsequently for 15 minutes at 120° C.

Subsequently an impregnation into the solution from Example 7 for 1 minute was carried out, followed by drying at 120° C. for 10 minutes. After this an impregnation into the dispersion from Example 6 for 1 minute was carried out, followed by drying at 120° C. for 10 minutes. Subsequently, an impregnation into the solution from Example 7 for 1 min was carried out, followed by drying at 120° C. for 10 min. After this an impregnation into the dispersion from Example 6 for 1 min was carried out, followed by drying at 120° C. for 10 min. Subsequently, an impregnation into the solution from Example 7 for 1 minute was carried out, followed by drying at 120° C. for 10 minutes. After this an impregnation into the dispersion from Example 6 for 1 minute was carried out, followed by drying at 120° C. for 10 minutes.

The tantalum anodes were then coated with a graphite and subsequently with a silver layer and are from then on tantalum capacitors.

The tantalum capacitors were then subjected to storage tests (85° C. at 85% relative humidity). The increase in ESR after storage, i.e. the ratio of ESR after storage to ESR before storage, are listed in table 4.

TABLE 4

Evaluation of the tantalum capacitors

|   | stabilizer solution | storage time [h] | increase in ESR after storage |
|---|---|---|---|
| example 9-1 | 3 | 182 | 0.9 |
| comparison example 9-1 | none | 182 | 1.1 |
| comparison example 9-2 | 2 | 182 | 2.2 |

LIST OF REFERENCE NUMERALS 1 electrode body
2 electrode material
3 dielectric
4 electrode surface of anode body
5 solid electrolyte
6 capacitor body
7 stabilizer
8 pores
9 layer composition
10 substrate
11 substrate surface
12 stabilized electrically conductive polymer layer
13 electrically conductive polymer layer
14 stabilizer layer

The invention claimed is:

1. A process for the production of a layer composition, comprising the process steps:
   (a) provision of a substrate with a substrate surface;
   (b) formation of a stabilized electrically conductive layer on at least a part of the substrate surface, the formation of the stabilized electrically conductive polymer layer comprising the process steps:
      b1) formation of an electrically conductive polymer layer comprising an electrically conductive polymer on at least a part of the substrate surface;
      b2) application of a liquid stabilizer phase, comprising at least one stabilizer and at least one solvent or dispersant, onto the electrically conductive polymer layer obtained in process step b1) for the formation of a stabilizer layer, wherein the at least one stabilizer is a flavonoid selected from the group consisting of a flavanonol, a flavanone and a mixture thereof.

2. The process according to claim 1, wherein in process step b) the electrically conductive polymer layer is formed in situ on the substrate surface.

3. The process according to claim 1, wherein after application of the liquid stabilizer phase in process step b2) the solvent or dispersant is at least partly removed in a further process step b3).

4. The process according to claim 1, wherein the stabilizer is a flavanone.

5. The process according to claim 4, wherein the stabilizer is Naringenin.

6. The process according to claim 1, wherein the substrate comprises an electrolyte body of an electrode material, and a dielectric at least partly covers a surface of this electrode material.

7. The process according to claim 1, wherein the electrically conductive polymer comprises a polythiophene.

8. A layer composition, obtainable by the process according to claim 1.

9. A layer composition, comprising
   S1. a substrate with a substrate surface;
   S2. a stabilized electrically conductive polymer layer following the substrate surface, wherein the stabilized electrically conductive polymer layer comprises:
      S2a. an electrically conductive polymer layer following the substrate surface and comprising an electrically conductive polymer;
      S2b. a stabilizer layer following the electrically conductive polymer layer and comprising at least one stabilizer, wherein the at least one stabilizer is a flavonoid selected from the group consisting of a flavanonol, a flavanone and a mixture thereof.

10. The layer composition according to claim 9, wherein the stabilizer is a flavanone.

11. The layer composition according to claim 10, wherein the stabilizer is Naringenin.

12. The layer composition according to claim 9, wherein the electrically conductive polymer comprises polythiophene.

* * * * *